United States Patent [19] [11] 4,091,328

Hellman et al. [45] May 23, 1978

[54] REMOTE CONTROL RADIO SYSTEM

[75] Inventors: Robert R. Hellman, Bridgeport; Douglas M. French, Clinton, both of Conn.

[73] Assignee: Westport International, Inc., Milford, Conn.

[21] Appl. No.: 701,434

[22] Filed: Jun. 30, 1976

[51] Int. Cl.$^2$ .............................................. H04B 7/00

[52] U.S. Cl. ...................................... 325/37; 325/396; 343/225

[58] Field of Search ................. 325/37, 142, 143, 390, 325/391, 392, 395, 396; 340/167 R, 167 A, 205, 206, 171 PF; 343/225-228; 318/599, 606, 16; 179/15 AW

[56] References Cited

U.S. PATENT DOCUMENTS

| | | | |
|---|---|---|---|
| 2,788,476 | 4/1957 | Shaw | 325/37 |
| 3,257,651 | 6/1966 | Fzisel | 179/15 AW |
| 3,806,939 | 4/1974 | Palmieri | 343/225 |
| 3,858,116 | 12/1974 | Friedl et al. | 325/37 |

OTHER PUBLICATIONS

"Heath kit Assembly Manual", 5-Channel Digital Proportional Radio Control System, Model GD-19, 1969, pp. 102-117.

*Primary Examiner*—Robert L. Griffin
*Assistant Examiner*—Jin F. Ng
*Attorney, Agent, or Firm*—Ernest M. Junkins

[57] ABSTRACT

A system for individually adjusting a plurality of remotely located servo units according to the position of a manual control for each servo unit by broadcasting a carrier wave that is switched on and off for division into repeating sequences with the reset signal to repeat a sequence having a short broadcast duration followed by a long silent period and in which the shifting of the control from one servo unit to the next in a sequence is directed by the leading edge of a broadcast period that occurs in a sequence for each servo unit and which is of the same duration as the reset broadcast signal to thereby decrease the total broadcast time for each sequence while also reducing the possibility of interference by extraneous signals.

18 Claims, 7 Drawing Figures

REMOTE CONTROL RADIO SYSTEM

In our copending application, Ser. No. 585,249, filed June 9, 1975 there is disclosed a radio system for remotely adjusting a plurality of servo units in accordance with the position of a manual control for each servo unit with the system broadcasting a wave that is switched on and off for division into repeating sequences. Each sequence includes a segment for each servo unit with each segment having a silent period and a broadcast period. The duration of the silent period is varied in accordance with the position of its manual control while the broadcast period for each segment is essentially constant so that the total duration of a segment dictates the position to be assumed by the servo unit. In addition, to effect repeating of a sequence, a relatively long reset pulse has heretofore been broadcasted at the end of the segments.

While the heretofore system has been found quite satisfactory, it has become desirable to further reduce the duration of the total broadcast time for each sequence and also to decrease the susceptibility of the system to extraneous or interfering broadcast waves which could be received by the remote receiver and cause erroneous signals to the servo units.

It is accordingly an object of the present invention to provide a remote control radio system for controlling a plurality of servo units in which by minimizing the broadcast time for each sequence, the transmitted power may be increased without substantial increase in the electrical power required.

Another object of the present invention is to provide a remote control radio system ~~which has~~ reduced susceptibility to reacting to extraneous broadcasted waves that it may receive.

A further object of the present invention is to achieve the above objects without substantially altering either the circuit, the manner of its operation or the cost of manufacture of a heretofore known system.

In carrying out the present invention, the system disclosed in the above-noted application is somewhat altered so that the segment for each servo unit which consists of a silent period and a broadcast period is inverted to have the broadcast period precede the silent period. Thus, a change from one segment for controlling a servo unit to the next segment for controlling the next servo unit is initiated by the beginning of each broadcast period rather than as heretofore, the trailing or terminating portion of a broadcast period of a prior segment. The variable duration of a silent period for each segment is, however, still altered, as heretofore known, to provide information of the manual setting of its controls. During each segment silent period, the system is made to be unresponsive to interfering signals that may be received and which have a duration which is less than about two-thirds of the duration of the fixed broadcast period.

The present system reduces the total broadcast time for a sequence by providing a shortened reset broadcast period that initiates the end of each sequence with the reset broadcast period duration being made to be of the same duration as a segment broadcast period. The sequence reset broadcast period is, however, followed by a relatively long silent reset period during most of which the receiver is made to be inhibited to reacting to interference by other broadcasted waves. Using the present invention, the total broadcast time for a sequence having control over eight servo units, i.e., eight segments in a sequence, is thus reduced to about 4½ milliseconds in a normal sequence time of 18 milliseconds. This increases the ratio of silent time to broadcast time to approximately 1 to 3, namely 4½ to 13½ milliseconds. Moreover, the ability to be unresponsive to extraneous waves received during the longer silent time is enhanced.

Other features and advantages will hereinafter appear.

In the drawing —

Figure 1:
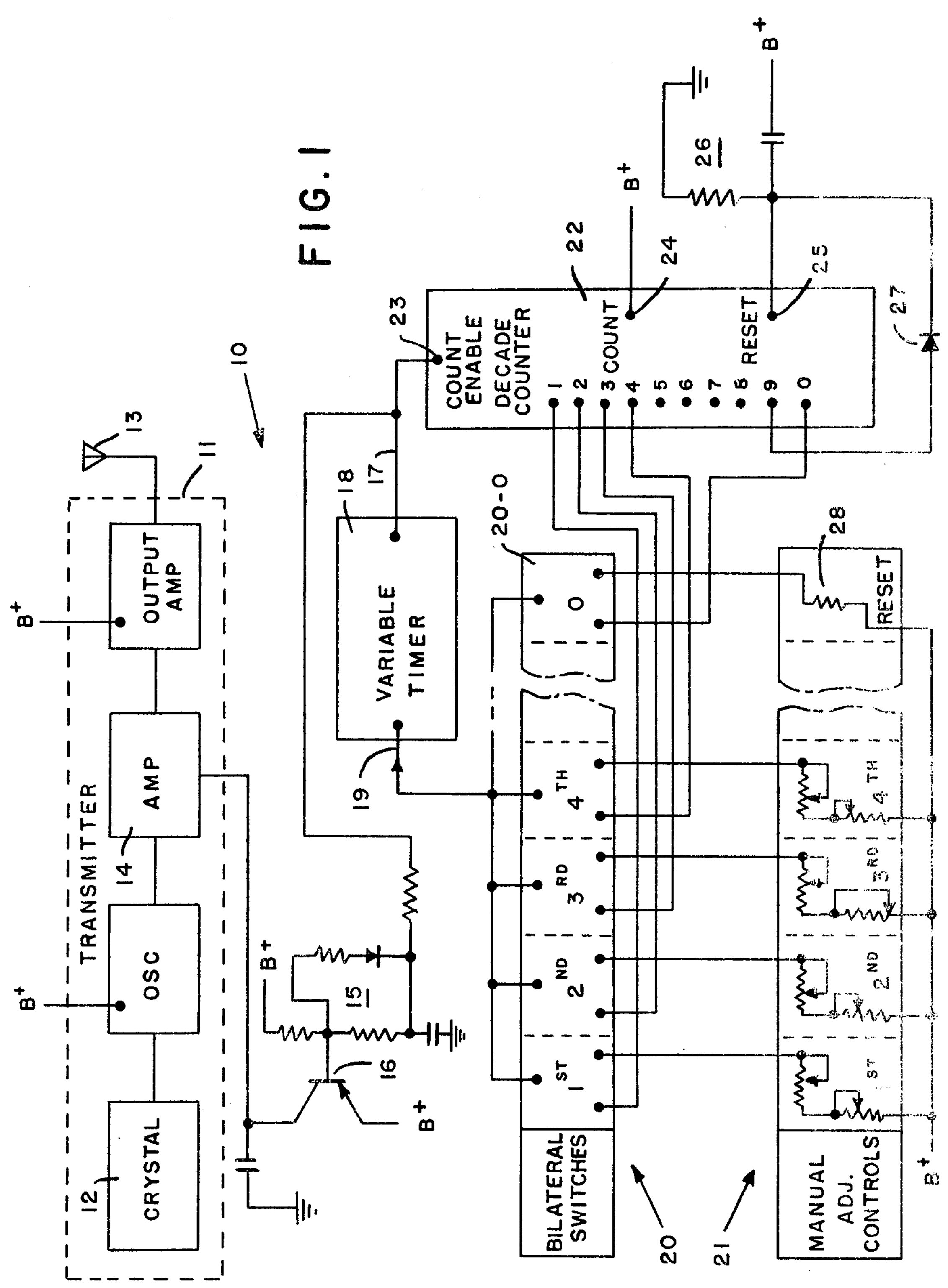
FIG. 1 is a block and electrical schematic diagram of the transmitter of the present invention of a remote control radio system.

Referring to the drawing, the transmitter is generally indicated by the reference numeral 10 and includes within a dotted block 11, the basic components of an AM transmitter that is identical to the transmitter described in our copending application though, of course, if desired an FM transmitter may be employed. A crystal 12 sets the frequency of the wave that is broadcasted by an antenna 13 to one constant frequency and amplitude. The transmitter further includes an amplifier 14 which is connected to a B+ source by way of a power switching circuit 15 that includes a transistor 16.

The transistor 16 is connected to the components shown and to an output 17 of a variable timer 18. Whenever the timer output 17 is low, the transistor 16 is caused to conduct, energizing amplifier 14 and causing the transmitter 10 to broadcast a radio wave at the frequency set by the crystal 12. Whenever the timer output 17 is high, the transistor 16 is non-conducting, the amplifier 14 is unenergized and there is no broadcasting of a radio wave, thereby producing a silent period.

The variable timer 18 is of the type disclosed in our prior application and it functions to produce a high voltage on its output 17 for a duration determined by the value of current flow in its input lead 19. After such an adjustable high duration time, its output switches to a low voltage for a fixed duration and then reverts to a high output voltage. Thus a high value of current flow in the input lead 19 will cause a short high duration plus a fixed low duration while a low value will produce a long high duration plus the same fixed low duration. As in our prior system, it is preferred that the extent of the low duration be essentially 0.5 milliseconds while the high duration varies within a range of 0.5 to 1.5 milliseconds.

The input lead 19 is connected to a plurality of bilateral switches 20 with each switch being, in turn, connected to one of a plurality of manually adjustable controls 21. The setting of each of the adjustable controls determines, through its corresponding bilateral switch, the value of the current flow in the input lead 19 when the switch is actuated and hence the duration of the high voltage on the output lead 17.

Each of the bilateral switches has a connection to the count terminals of a decade counter 22 with the first bilateral switch being connected to the count 1 terminal, the second bilateral switch to the count 2 terminal, the third bilateral switch to the count 3 terminal, etc. With these connections, the count of the decade counter 22 only actuates the bilateral switch corresponding to this count which connects the adjustable control associated with the said bilateral switch to the input of the variable timer 18 for the entire duration that the count exists.

The counter 22 has a count enable terminal 23 connected to the output 17 of the variable timer 18, a count terminal 24 connected to a B+ source and a reset terminal 25 connected to a resistance capacitive timing network 26. Also the reset terminal 25 is connected by a diode 27 to the count 9 terminal. With this circuitry, as the voltage on the count terminal is always high, a high to low voltage change on the count enable terminal advances the counter count one count. Thus, the counter 22 changes its count whenever the output lead 17 has its voltage shifted from high to low which occurs at the beginning of each broadcast period.

The counter 22 is reset to a count 0 shortly after it attains a count which is one more than the number of adjustable controls and servo units in the system. In the specific embodiment herein disclosed, it is assumed that there are eight manual controls and hence when the counter has a count of 9, the high voltage through the diode 27 to the reset terminal 25 causes the counter to immediately be reset to a count of 0. The resistance capacitive network 26 maintains this voltage for a short duration sufficient to assure resetting before returning to its normal low voltage at the reset terminal.

The count 0 terminal is connected to a bilateral switch 20-0 which, when actuated, connects a resistance 28 located in the reset block of the adjustable controls 21 to the timer input lead 19. The resistance 28 is selected to have a value that is quite high in order to produce a long high duration, preferably on the order of 5½ milliseconds, of the timer output 17. Upon the termination of such a time interval, the voltage in the lead 17 will decrease to low causing the counter count to assume a count of 1 to begin the next sequence.

It will be understood that in the event that there is a lesser number of servo units, the diode 27 would be connected to the counter count that is 1 higher than the number of servo units. Thus, if there are only four servo units, the diode 27 would be connected to the count 5 terminal. Irrespective of which count terminal is connected to the diode, however, the reset time silent period will remain at 5½ milliseconds as the value of resistor 28 does not change.

Figure 3:
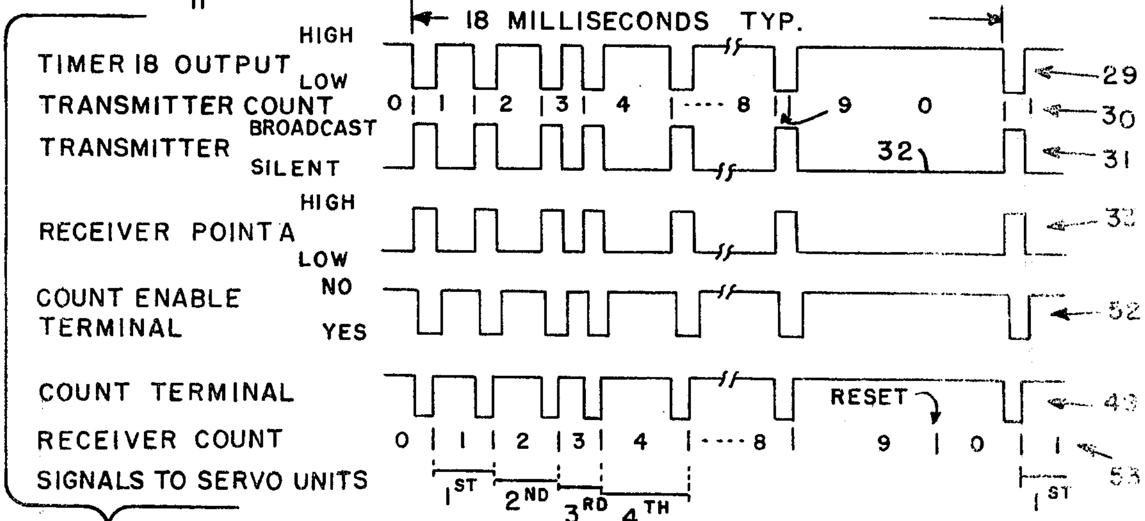
FIG. 3 is a plot of different wave forms that occur in the present system.

Referring to FIG. 3, a plot of the wave form of the voltage on the timer output lead 17 is indicated by the reference numeral 29 while a plot of the count of the counter 22 of the transmitter is indicated by the reference numeral 30. As shown, whenever the timer output decreases from high to low, the counter increments so that the system indexes its count on the leading edge of the constant low voltage duration of the timer. As the switch 15 is also connected to the output of the variable timer, a plot 31 indicates those periods when the transmitter is energized to broadcast and when it is unenergized and hence silent. It will be noted that the transmitter broadcasts only for the essentially fixed duration of the low voltage of the timer 18. It will also be noted that there is a long silent reset period indicated by the reference numeral 32.

The silent period of each segment preferably is adjustable within a range of 0.5 to 1.5 milliseconds with its average or neutral time being 1 millisecond. As each broadcast period is 0.5 milliseconds, each segment may thus have a duration within the range of 1 to 2 milliseconds while the reset time is a 5.5 silent period plus a 0.5 broadcast period or 6 milliseconds. Thus, with 8 normal segments the total broadcast time is 4.5 (9 × 0.5) milliseconds while the total duration of the silent periods is 8 (8 × 1.0) plus 5½ or 13½ milliseconds.

Figure 2:
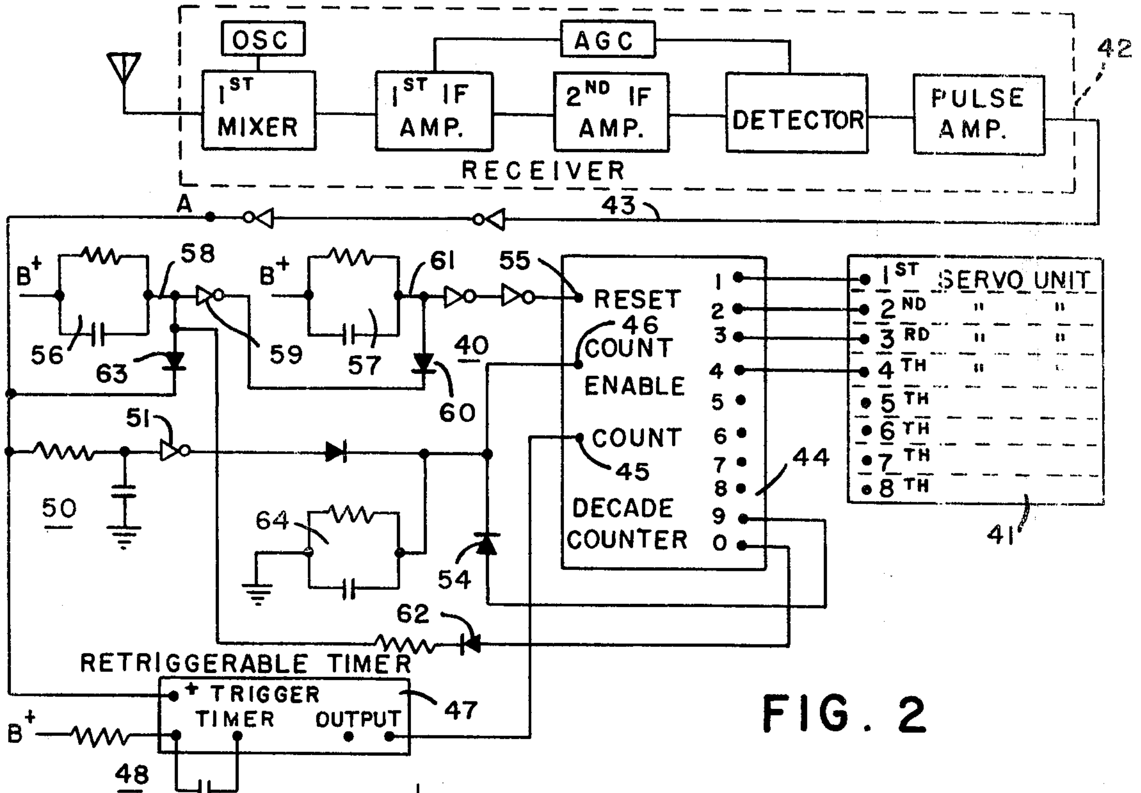
FIG. 2 is a block and schematic diagram of the receiver.

The wave broadcasted by the transmitter 10 is received by a receiver, generally indicated by the reference numeral 40 in FIG. 2 and is used to control eight individual servo units shown in a block 41. The components within a dotted line block 42 constitute a radio tuned to receive the frequency that is broadcasted and to produce on an output lead 43, at a point A, a detected signal having the wave form that is depicted in FIG. 3 and indicated by the reference numeral 33. It will be noted that at the point A, the voltage is high whenever the transmitter is broadcasting and is low whenever the transmitter is silent. The voltage level at the point A is used to control the indexing and resetting of a decade counter 44 which has count terminals 0 through 9. The count 1 terminal is connected to the 1st servo unit in the block 41, the count 2 to the 2nd servo unit, etc., so that only each servo unit will receive energization for the duration that the counter has the count which corresponds to that servo unit. As is well known in the art, a servo unit will assume a position that corresponds to the duration that it receives energization.

The counter 44 has a count terminal 45 and a count enable terminal 46 both of which are connected through timing circuits to the point A with the counter being only able to index its count on a shift of voltage at its count terminal from a low to high while the count enable terminal has a low voltage. Connected between the count terminal 45 and the point A is a retriggerable monostable timer 47 (which may be one-half of a dual timer type MC14528 available from Motorola, Inc.) and which is adjusted by the value of an R-C network 48 to provide a low output voltage for a period of about 0.4 milliseconds upon the voltage at the point A going from low to high. Each time this point A voltage change occurs, the 0.4 millisecond period begins. A plot of the output of the timer 47 at the count terminal 45 is indicated in FIG. 3 by the reference numeral 49 which shows the count terminal shifting from low to high about 0.4 milliseconds after the beginning of a detected broadcast period.

The count enable terminal 46 is connected to the point A by way of an R-C network 50 and an inverting amplifier 51 so that the count enable terminal initially becomes low about 0.075 milliseconds after the detection of the beginning of a broadcast period. It is maintained low thereafter at least for the duration of the broadcast period. A plot, indicated by the reference numeral 52 in FIG. 3, displays the voltage values at the count enable terminal 46. It will be seen that by comparing the plots 49 and 52 that the counter is indexed whenever the count terminal goes high while the count enable terminal has a low voltage. The duration of each count of the counter 44 is shown by a plot 53.

The use of the retriggerable timer 47 and the delay circuit 50 serve to prevent interfering detected signals that are received by the receiver from sources other than the system's transmitter from altering the count of the counter if they are less than about 0.325 milliseconds. Thus, if the timer 47 is set for 0.4 milliseconds and there is a 0.075 millisecond delay caused by the R-C network 50, receipt of an interfering pulse of less than 0.325 milliseconds continuous duration will not index the counter count as the count enable terminal will have turned high to inhibit indexing before the output of the timer 47 shifts from low to high. This time interval may be varied somewhat by changing the low time of the retriggerable timer 47 with a shorter low time decreasing the duration that an interference pulse has to have without causing interference by indexing the counter. It is preferred, however, that the low time be in a range of 0.35 to 0.45 milliseconds for the timer 47.

The duration of the rejected interfering signal is caused to be somewhat less than 0.4 milliseconds because of the delay in the timing circuit 50 attaining a low voltage after the end of a detected broadcasted signal.

Each time that the voltage at the point A shifts from low to high, the timer 47 initiates its 0.4 millisecond low time. This prevents a series of quite short duration interference pulses that may occur during a silent period from indexing the count of the counter while still enabling the timer 47 to respond to a broadcast pulse from the transmitter 10 as its output changes from low to high in the same time after the leading edge of a broadcast pulse as if the interference pulses had not occurred.

Upon the counter 44 achieving a count of eight the next broadcast pulse is the reset broadcast pulse which initiates the reset segment so that the counter can achieve a count of 1 with a subsequent broadcast pulse. The reset pulse is followed by a long silent period of 5½ milliseconds during most of which the counter has a count of 9 or of 0 and is locked against change at the count 9 so that interfering signals cannot alter it.

The reset broadcast pulse initially indexes the counter to a count 9 which causes the high voltage at the count 9 terminal to be applied by way of a diode 54 to the count enable terminal 46. This high voltage on the count enable terminal inhibits the counter from indexing until it is removed, thus rendering it unsusceptible to interfering pulses during such a time interval. This inhibitation is removed only by the application of a high voltage to the counter's reset terminal 55 which, when occurring, causes the counter to assume a count of zero.

The reset terminal 55 and point A are interconnected through two timing circuits 56 and 57 so that a reset voltage cannot be applied until a time expires which is greater than the sum of the duration of the two timing circuits. The sum is larger than the period of a segment but less than the extent of the reset period so as not to be effected by the segment periods.

Upon receipt of the leading edge of a detected broadcast period, the point A turns high and the values of the resistance and capacitor in the circuit 56 prevents its output 58 from becoming high until about 0.25 milliseconds after the leading edge of the broadcast pulse is received. The output 58 is connected through an inverting amplifier 59 and a diode 60 to the output 61 of the timing circuit 57 which is also connected to the B+ source. The low voltage on the output 61 immediately discharges the timing circuit 57 causing its output to become low. The values of the resistance and capacitance of the timing circuit 57 are selected to require about a 3¾ millisecond duration after the output timing circuit 56 goes low before the output 61 will be changed to high. This latter low to high voltage change is amplified by two inverting amplifiers and applied to the reset terminal 55 which causes the counter to be reset and its count shifted from 9 to 0. This change in count removes the inhibiting signal on the count enable terminal by way of the diode 54 from the count 9 terminal. However, as long as the output of timing circuit 57 remains high, the counter will remain locked at the reset count until the high voltage is removed. Thus for at least the duration of timing circuit 57 after the termination of the reset broadcast pulse, herein specifically 3.75 milliseconds, the counter 44 is disenabled at a nine count which prevents any change therein by any received interfering pulses. The shifting of the counter count from 9 to 0 is indicated in the plot 49 by the word "reset" and occurs substantially towards the end of the silent period.

Removal of the reset is effected by the occurrence of the subsequent detected broadcast pulse of the first segment of the next sequence which causes the voltage at the output 58 of timing circuit 56 to increase and discharge the circuit 57. While the increase could take 0.25 milliseconds, it has been found desirable to somewhat decrease this time by use of a connection from the count 0 terminal through a diode 62 to the output 58 of the timing circuit 56. This connection supplies current to the output 58 while the count 0 exists which decreases the charging time of the timing circuit 56 so that output 58 becomes higher somewhat quicker than 0.25 milliseconds after the beginning of the subsequent detected segment broadcast pulse.

With the output 58 high, the output of the inverting amplifier 59 becomes low, which effects discharge of the timing circuit 57 and the subsequent removal of the high voltage on the reset terminal 55. The selection of the components is made so that the high voltage is removed from the terminal 55 in less time than the timing cycle of the retriggerable timer 47 to assure that the counter will not be inhibited when the timer 47 output shifts from its low to high voltage on the count terminal 45. The diode 62 assures that the reset voltage will be removed prior to the counter having to respond.

When the point A has a low voltage, during the absence of a detected broadcasted pulse, the current through the diode 62 is passed through the diode 63 to the point A thereby maintaining the output 58 low as if the connection did not exist.

It will thus be seen that the counter 44 is forced to maintain a count of 9 or 0 for essentially the entire silent period of the reset signal and at least part of the beginning of the next broadcast pulse. Thus, interfering pulses of lesser duration than 0.25 milliseconds will be blocked by the timing circuit 56. Those interference pulses of larger duration than 0.25 milliseconds which terminate in time for the circuit 57 to apply a reset signal before the counter is indexed by the subsequent segment broadcast pulse will not effect the abovedescribed operation. Those interference pulses also of longer duration than 0.25 milliseconds but which terminate before the timing circuit 57 can apply a reset signal will cause the subsequent broadcast period to discharge the timing circuit so that no reset signal will be applied. The counter then remains locked at the nine count for the entire segments of the following sequence until the reset signal is capable of being applied during the reset silent period in the next sequence. This causes loss of a sequence as no signals are applied to the servo units and hence they will remain where they were last positioned.

The usual broadcast pulses for each segment occur within 2 milliseconds and thus normally maintain the output of the timing circuit 57 at a low voltage which does not interfere with indexing of the counter.

A discharge circuit 64 is connected to the count enable terminal 46 to provide a discharge path for the high voltage applied to this terminal, either from the point A or from the count 9 terminal. The components preferably are selected to permit the voltage change to occur within a few microseconds.

Figure 4:
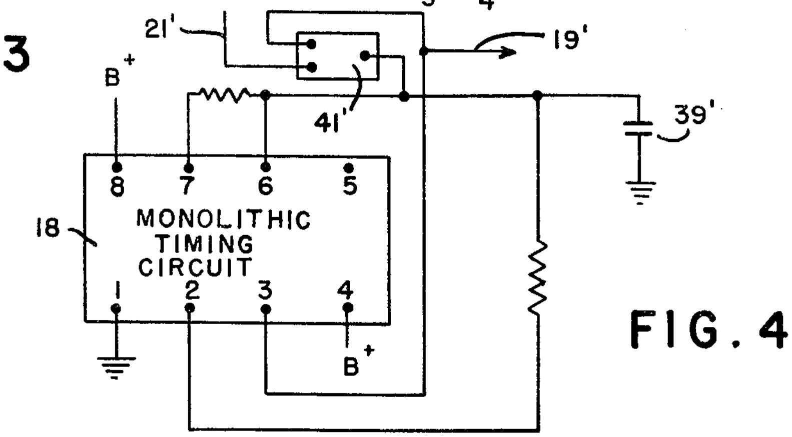
FIG. 4 is a block and schematic diagram of one embodiment of a variable timer that may be used in the present transmitter.

Shown in FIG. 4 is a diagram of a connection of the variable timer 18 with the connections thereto being identical to the connections in our above-noted application and similar reference numerals are applied thereto with, however, the addition of a prime indication. It will be noted, however, that a connection between the seventh pin of the timing circuit 18 to the bilateral switch 41′ has been removed which does not involve a change of functioning or timing. This change requires that the entire charging current for capacitor 39′ be carried alone by the switch 41, which avoids excessive current during the discharge period when pin 7 is internally connected to ground from also grounding lead 21′.

It will accordingly be understood that there has been disclosed a remote control radio system for causing a plurality of servo units to assume positions dictated by a plurality of adjustable controls. The system minimizes the power needed for broadcasting the control information by limiting all broadcast periods to essentially the same duration with the control information for the servo units being contained within an adjustable duration silent period between the broadcast periods. However, the silent period for resetting or correlating the receiver to the transmitter is made to be longer than any adjustable duration to permit its identification. By minimizing the broadcast periods, the same amount of power then will provide a higher amplitude transmitted wave than with a system having a longer broadcasting period.

Additionally, the system is rendered quite immune to extraneous waves that may be received and detected into pulses during the silent periods by in effect inhibiting the receiver from reacting for all of the reset silent period and by increasing the duration which a pulse must have to substantially two-thirds of the duration of the constant broadcast periods.

Variations and modifications may be made within the scope of the claims and portions of the improvements may be used without others.

We claim:

1. A remote control radio system for positioning a servo unit in accordance with the setting of an adjustable control comprising a transmitter having broadcast means for broadcasting a radio wave upon energization, means for energizing the brodcast means to provide a broadcast period and for effecting deenergization of the broadcast means to provide a silent period, means connected to the energizing means and the adjustable control for adjusting the silent period in accordance with the setting of the adjustable control; a receiver having radio receiving means for receiving the broadcasted wave and providing a detected signal having one state that exists while a broadcasted wave is being received and another state that exists when a broadcasted wave is not being received, means for receiving the detected signal and applying a control signal to the servo unit that has a duration essentially equal to the sum of the duration of the one state and the another state and means for delaying the control signal applying means from applying the control signal to the servo unit until at least two-thirds of the duration of the one state of the detected signal has expired, thereby reducing the possibility of interference by extraneous signals.

2. The invention as defined in claim 1 in which the delaying means includes means for preventing the applying means from applying the control signal until two operative voltage levels simultaneously exist.

3. The invention as defined in claim 2 in which the means for preventing includes a first timing means for providing one operative voltage level only after the one state of the detected signal has existed for a duration that is at least two-thirds of the duration of a broadcast period one state of the detected signal.

4. The invention as defined in claim 2 in which the means for preventing includes a second timing means for providing a second operative voltage level only after the one state of the detected signal has existed for a small fraction of the duration of the broadcast period.

5. The invention as defined in claim 4 in which the second timing means maintains the second operative voltage for at least the duration that the one state of the control signal exists.

6. The invention as defined in claim 5 in which the second timing means eliminates the second operative voltage shortly after the detected signal shifts from the one state to the another state.

7. A remote control radio system for positioning servo units in accordance with the setting of adjustable controls with there being one control unit associated with one servo unit comprising a transmitter having broadcasting means for broadcasting a radio wave upon energization, means for energizing the broadcast means to provide a broadcast period and for effecting deenergization of the broadcast means to provide a silent period with an adjacent broadcast and silent period constituting a segment, means for providing a segment for each servo unit with the segments being continuous to form a sequence, means interconnecting the controls and the energizing means for varying the duration of the silent period of each segment in accordance with the setting of its associated control and for providing a constant duration broadcast period in each segment and means connected to the energizing means for providing a reset segment having a reset broadcast period and a reset silent period with said reset silent period having a duration at least four times the duration of the reset broadcast period in the sequence; and a receiver having a radio means for receiving the broadcasted wave and providing a detected signal having one state while a broadcast wave is being received and another state when a broadcast wave is not being received, indexing means for receiving the detected signal and interconnected with the servo units for applying a control signal to each servo unit related to the duration of its associated segment in the sequence, said indexing means having a reset condition and being caused to assume its reset condition upon application of a reset signal with said reset condition being an end of a sequence and means for receiving the detected signal and applying a reset signal upon the occurrence of the reset segment.

8. The invention as defined in claim 7 in which the reset silent period is approximately ten times the duration of the reset broadcast period.

9. The invention as defined in claim 7 in which the reset silent period is at least two times as long as the longest servo segment silent period.

10. The invention as defined in claim 7 in which the broadcast period for each servo segment is essentially of constant duration and the reset broadcast period has a duration essentially equal thereto.

11. The invention as defined in claim 7 in which the indexing means fails to supply a control signal during its reset condition and in which the indexing means maintains its reset condition while a reset signal is applied thereto.

12. The invention as defined in claim 11 in which the means for applying the reset signal includes first reset means for applying the reset signal for at least half of the duration of a reset segment.

13. The invention as defined in claim 12 in which the means for applying the reset signal includes a second reset means which upon actuation eliminates the reset signal supplied by the first reset means and means for actuating the second reset means towards the latter portion of the reset silent period.

14. The invention as defined in claim 13 in which the second reset means maintains the reset signal while actuated and in which the means for actuating includes deactivating means for eliminating the reset signal during the next one state of the detected signal caused by a broadcast period.

15. The invention as defined in claim 14 in which the indexing means is a counter having a count enable terminal and a number terminal at which a number signal appears for a count one greater than the number of servo units and in which the first reset means includes a connection between the number terminal and the count enable terminal for applying the reset signal supplied by the first reset means.

16. The invention as defined in claim 15 in which the indexing means includes a reset terminal, in which the second reset means includes a first timing means and a second timing means, said first timing means being connected to actuate the second timing means during the one state of a detected signal, and in which said second timing means produces its reset signal after actuation only after a duration greater than one-half the duration of the reset silent period.

17. The invention as defined in claim 7 in which the indexing means includes means for delaying the applying of the control signal to a servo unit until at least two-thirds of the duration of the one state of the detected signal caused by the broadcast period of the segment has expired.

18. The invention as defined in claim 17 in which the delaying means includes means for preventing the indexing means from applying the control signal until two operative voltage levels simultaneously exist.

* * * * *